(12) United States Patent
Zhang et al.

(10) Patent No.: US 10,694,555 B2
(45) Date of Patent: Jun. 23, 2020

(54) WIRELESS MESH NETWORK FORMATION

(71) Applicant: Hewlett Packard Enterprise Development LP, Houston, TX (US)

(72) Inventors: Guojun Zhang, Santa Clara, CA (US); Yan Liu, ChongQing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 13 days.

(21) Appl. No.: 16/073,084

(22) PCT Filed: Jan. 28, 2016

(86) PCT No.: PCT/CN2016/072525
§ 371 (c)(1),
(2) Date: Jul. 26, 2018

(87) PCT Pub. No.: WO2017/128180
PCT Pub. Date: Aug. 3, 2017

(65) Prior Publication Data
US 2019/0045558 A1 Feb. 7, 2019

(51) Int. Cl.
*H04W 76/10* (2018.01)
*H04W 84/18* (2009.01)
(Continued)

(52) U.S. Cl.
CPC ......... *H04W 76/10* (2018.02); *H04L 61/2007* (2013.01); *H04L 61/2092* (2013.01);
(Continued)

(58) Field of Classification Search
None
See application file for complete search history.

(56) References Cited

U.S. PATENT DOCUMENTS

2010/0061272 A1*  3/2010  Veillette ............... H04L 45/34
                                              370/254
2010/0125409 A1*  5/2010  Prehofer ............. G01C 21/206
                                              701/408
(Continued)

FOREIGN PATENT DOCUMENTS

CN     101945371 A    1/2011
CN     102858023      1/2013
(Continued)

OTHER PUBLICATIONS

Chapter 7: Secure Enterprise Mesh, 2015, pp. 1-42, User Guide, Aruba Networks.
(Continued)

*Primary Examiner* — Sai Aung
*Assistant Examiner* — Liem H. Nguyen
(74) *Attorney, Agent, or Firm* — Mannava & Kang, P.C.

(57) ABSTRACT

According to an example, in a method, an access point may determine whether the access point is to function as an unconnected mesh portal in a wireless mesh network. In response to a determination that the access point is to function as an unconnected mesh portal in the wireless mesh network, the access point may use a self-assigned Internet Protocol (IP) addressing technique to obtain an IP address for the access point. In addition, the access point may implement a stored static mesh key to form the wireless mesh network with another access point and to output configuration information to the another access point.

12 Claims, 5 Drawing Sheets

(51) Int. Cl.
*H04L 12/24* (2006.01)
*H04L 29/08* (2006.01)
*H04L 29/12* (2006.01)

(52) U.S. Cl.
CPC ...... *H04L 67/1044* (2013.01); *H04L 67/1091* (2013.01); *H04W 84/18* (2013.01); *H04L 41/0806* (2013.01); *H04L 61/2015* (2013.01)

(56) References Cited

U.S. PATENT DOCUMENTS

| | | | |
|---|---|---|---|
| 2011/0010760 A1* | 1/2011 | Goto | H04L 63/1441 726/4 |
| 2012/0014285 A1 | 1/2012 | Kalika et al. | |
| 2013/0003654 A1 | 1/2013 | Iyer et al. | |
| 2013/0007233 A1* | 1/2013 | Lv | H04L 61/2038 709/222 |
| 2014/0050208 A1 | 2/2014 | Annaluru et al. | |
| 2014/0169349 A1* | 6/2014 | Vyas | H04W 84/12 370/338 |
| 2015/0249921 A1 | 9/2015 | Lv et al. | |

FOREIGN PATENT DOCUMENTS

| | | |
|---|---|---|
| CN | 103313230 | 9/2013 |
| CN | 103686709 | 3/2014 |

OTHER PUBLICATIONS

International Searching Authority, The International Search Report and the Written Opinion, dated Oct. 28, 2016, PCT/CN2016/072525, 9 Pgs.
Lee Johnson and Mark L. Gress, "Deploying a Fast and Stable Wireless Mesh Network," Dec. 9, 2009, pp. 1-19, ciscopress.com.
Smart Mesh Networking, Dec. 18, 2012, pp. 1-4, Feature Sheet, Ruckus Wireless, Inc.
Proxim Wireless Corp., "ORiNOCO 882.11n Access Points Software Management Guide", Jun. 1, 2012, pp. 1-178.
Supplementary European Search Report and Written Opinion received for EP Patent Application No. 16887067.3, dated Aug. 20, 2019, 12 pages.

* cited by examiner

WIRELESS MESH NETWORK FORMATION

BACKGROUND

Certain wireless mesh networks can include a mesh portal and at least one mesh point that is in wireless communication with the mesh portal. A mesh portal can, in some situations, be in the form of an access point (AP) that is wired to a wired network and a mesh point is an AP that is not wired to the wired network and is in wireless communication with the mesh portal. Mesh portals can, for example, relay communications that are wirelessly received from the mesh points to components that are accessed via the wireless network and vice versa. For instance, a security server and a dynamic host configuration protocol (DHCP) server may be on the wired network and may perform various security and DHCP functions for the APs on the mesh network.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Additionally, It should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Certain implementations of the present disclosure are directed to access points and methods for forming a wireless mesh network using the access points. In some implementations, the access points and methods disclosed herein enable a wireless mesh network to be formed while none of the access points are wired to a wired network. In contrast to certain mesh networks in which one of the access points is wired to a wired network and functions as a mesh portal, certain implementations of the wireless mesh network disclosed herein may be completely wireless. In one regard, therefore, such access points may perform operations that differ from those of other access points because the access points of certain wireless mesh networks disclosed herein do not have a wired connection to a wired network and do not communicate with entities on the wired network, such as a DHCP server, security server, etc.

According to an example, one of the access points may be designated as an unconnected mesh portal in the wireless mesh network, while the other access points may function as mesh points in the wireless mesh network. The unconnected mesh portal may be an access point that is not wired to a wired network, but may perform some functions that are similar a mesh portal that is connected to a wired mesh network. For instance, the unconnected mesh portal may output configuration information to the other access points in the wireless mesh network, such that the other access points may function as mesh points in the wireless mesh network. A user may designate one of the access points as the unconnected mesh portal in any of a number of manners. By way of example, a user may connect two ports, e.g., Ethernet ports, together with an external cable and the access point may determine that the access point is to function as the unconnected mesh portal in response to detecting that such a connection has been made.

The access points may have default settings that the access points are to implement in joining a mesh network in which one of the access points is wired to a wired network. For instance, when one of the access points is wired to a wired network, each of the access points may perform a DHCP operation via a mesh portal to obtain IP addresses. According to an example, however, the access points disclosed herein may bypass or skip those default settings and may instead implement other settings as disclosed herein when the access points determine that they are to join or form a wireless mesh network in which none of the access points are wired to a wired network. The other settings disclosed herein may enable the access points to bypass certain security requirements as well as avoid certain scanning operations. For instance, the access points may be provided with a static mesh key, which the access points may use to initially communicate with each other. The static mesh key may be combination of characters, numbers, and/or symbols, may be predefined and stored in the data stores of the access points during manufacture of the access points. Additionally, the access points may also avoid a DHCP process by self-assigning IP addresses.

Through implementation of the access points and methods disclosed herein, a wireless mesh network may be formed in a relatively fast and efficient manner as compared with mesh networks that have an access point that is wired to a wired network. In one example, the access points and methods disclosed herein may be implemented to quickly form a temporary wireless mesh network.

Figure 1A:
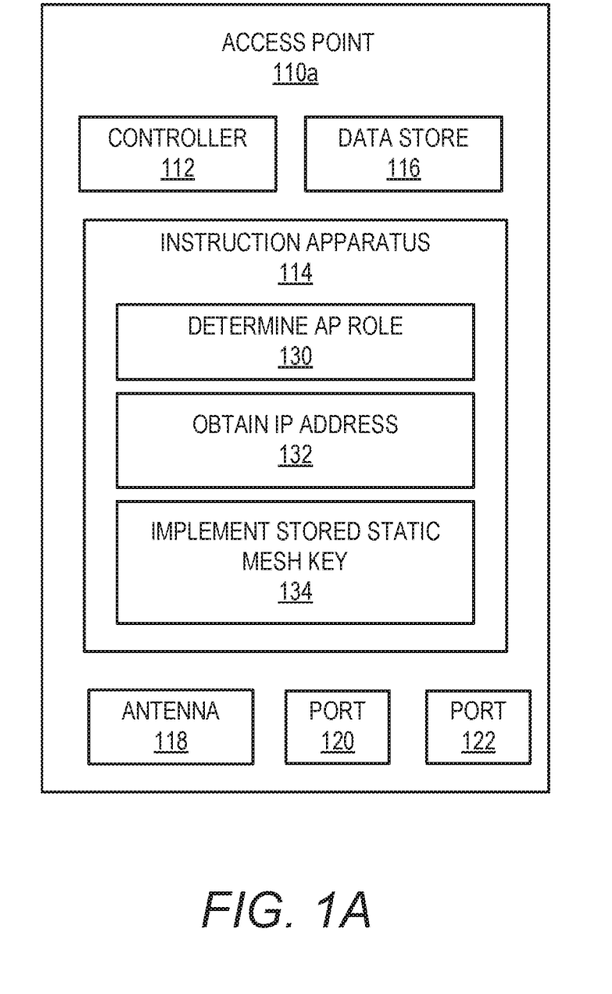
FIG. 1A is a block diagram of an access point that is to execute a method for forming a wireless mesh network, according to an example of the present disclosure.
Figure 1B:
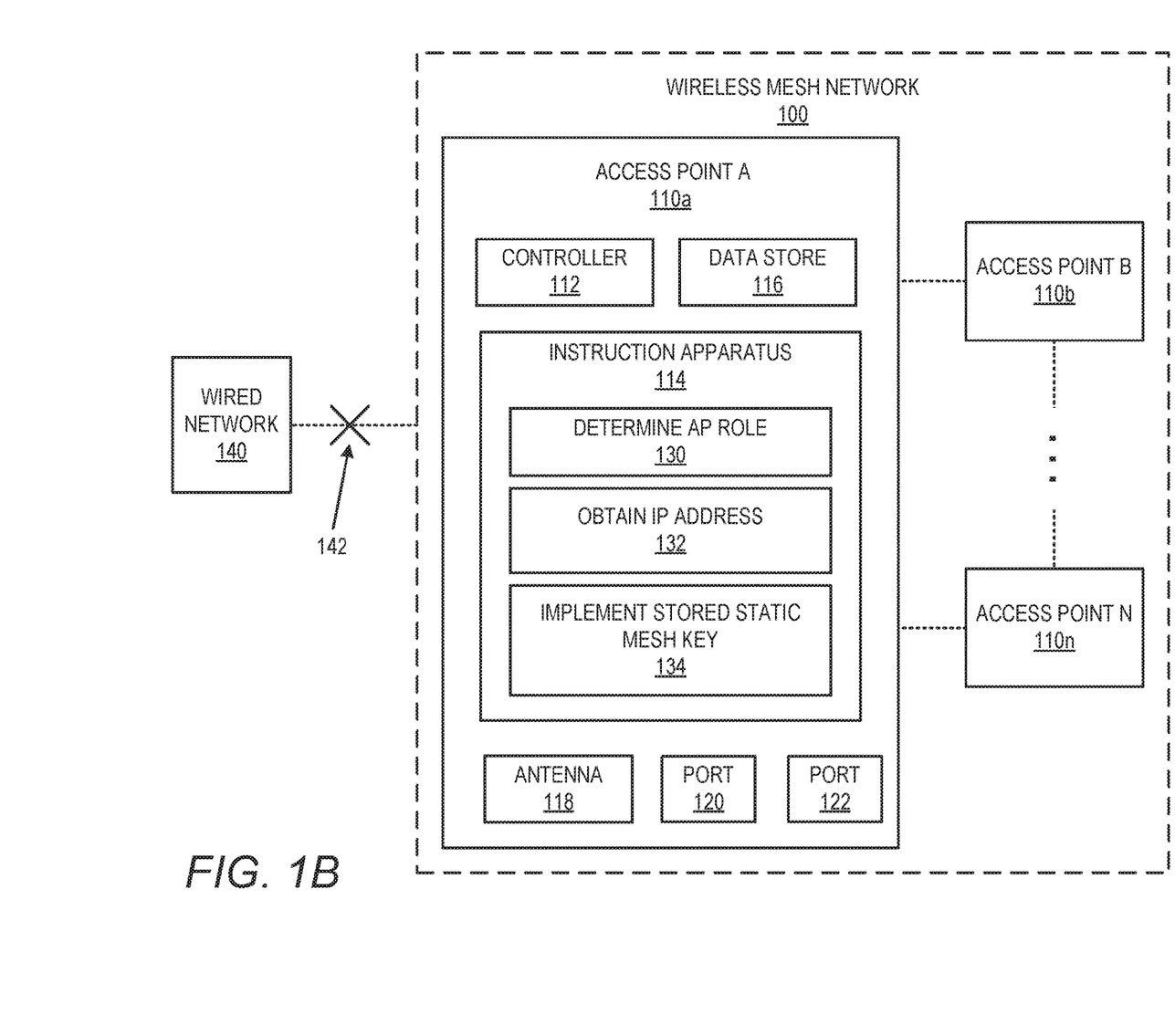
FIG. 1B is a block diagram of a wireless mesh network within which is contained access points that are each to execute a method for forming the wireless mesh network, according to an example of the present disclosure.

With reference first to FIGS. 1A and 1B, there are respectively shown block diagrams of an access point 110a that is to execute a method for forming a wireless mesh network and a wireless mesh network 100 within which is contained access points 110a-110n that are each to execute a method for forming the wireless mesh network 100, according to examples of the present disclosure. As shown, the wireless mesh network 100 may be formed of a plurality of access points 110a-110n, in which the variable "n" is an integer value. Generally speaking, each of the access points 110a-110n is a wireless device that allows wireless client devices (not shown) to connect to servers (not shown), other client devices, or the like. According to a particular example, none of the access points 110a-110n in the wireless mesh network 100 is wired to a wired network 140, as indicated by the broken line 142. As discussed in greater detail herein below, the access points 110a-110n may form the wireless mesh network 100 in a relatively quick and efficient manner without one of the access points 110a-110n being wired to the wired network 140.

The access point 110a is depicted as including a controller 112, an instruction apparatus 114, a data store 116, an antenna 118, a first external port 120, and a second external port 122. The other access points 110b-110n may have similar features to the access point 110a and thus, the description of the access point 110a is intended to also pertain to the access points 110b-110n. In addition, each of the access points 110a-110n in the wireless mesh network 100 may wirelessly communicate with each other via their respective antennas 118 as denoted by the dotted lines connecting the access points 110a-110n.

The controller 112 may be any of a central processing unit (CPU), a semiconductor-based microprocessor, an application specific integrated circuit (ASIC), and/or other hardware device suitable for retrieval and execution of instructions stored in the instruction apparatus 114. The controller 112 may fetch, decode, and execute instructions, such as the instructions 130-134 stored on the instruction apparatus 114. The instruction apparatus 114 may be a hardware device that is either programmed with instructions or otherwise stores instructions. For instance, the instruction apparatus 114 may be a circuit component that is programmed with the instructions 130-134. In this example, the controller 112 and the instruction apparatus 114 may be formed as an integrated circuit.

In another example, the instruction apparatus 114 may be a machine readable storage medium, e.g., an electronic, magnetic, optical, or other physical storage device that contains or stores executable instructions. For instance, the instruction apparatus 114 may be Random Access Memory (RAM), an Electrically Erasable Programmable Read-Only Memory (EEPROM), a storage device, an optical disc, or the like. In some implementations, the instruction apparatus 114 may be a non-transitory machine-readable storage medium, where the term "non-transitory" does not encompass transitory propagating signals.

In any regard, the controller 112 may execute the instructions 130-134 to determine 130 the role of the access point (AP) 110a in the wireless mesh network 100, obtain 132 an Internet Protocol (IP) address for the access point 110a, and to implement 134 a stored static mesh key to form the wireless mesh network 100 with the other access point(s) 110b-110n. The same static mesh key may be stored in the data stores 116 of each of the access points 110a-110n. For instance, a static mesh key, which may be combination of characters, numbers, and/or symbols, may be predefined and stored in the data stores 116 during manufacture of the access points 110a-110n. Thus, for instance, the access points 110a-110n may communicate with each other using the same static mesh key without requiring that the access points 110a-110n perform a scan for a mesh key to be used to communicate with the other access points 110a-110n in the wireless mesh network 110. As the scanning for a mesh key in a wireless mesh network typically takes a relatively long period of time, formation of the wireless mesh network 100 by the access points 110a-110n as disclosed herein may require a relatively shorter amount of time as compared with known formation techniques.

As described in detail below, the controller 112 may execute the instructions 130-134 to quickly form the wireless mesh network 100 while none of the access points 110a-110n are in wired connection to the wired network 140. In one regard, as none of the access points 110a-110n are in wired connection to the wired network 140, none of the access points 110a-110n may be designated as a mesh portal. To address this issue, and according to an example, a user may designate one of the access points 110a-110n as an unconnected mesh portal. In other words, one of the access points 110a may be designated to perform some of the functions of a mesh portal without being in a wired connection to a wired network 140.

The access point 110a may be designated as the unconnected mesh portal in any of a number of manners. For instance, the controller 112 may determine that the access point 110a is to function as the unconnected mesh portal when the controller 112 detects, during a boot from a factory default, that the ports 120 and 122 are connected to each other via an external cable. By way of example, the ports 120 and 122 are first and second Ethernet ports and a user may designate the access point 110a to function as the unconnected mesh portal by connecting an Ethernet cable to both of the ports 120 and 122 prior to booting the access point 110a from the factory default.

As another example, the access point 110a may be equipped with a hardware button or other hardware feature that when activated instructs the controller 112 that the access point 110a is to function as either an unconnected mesh portal or a mesh point. As a yet further example, the controller 112 may provide a user interface during the boot process, which may enable a user to indicate whether the access point 110a is to function as an unconnected mesh portal or a mesh point.

As described in greater detail herein below, the controller 112 may perform different operations depending upon whether the access point 110a is to function as an unconnected mesh portal or as a mesh point. In any regard, the controllers 112 in the access points 110a-110n may perform the different operations to quickly build or form the wireless mesh network 100 as also described in greater detail herein below.

Figure 2:
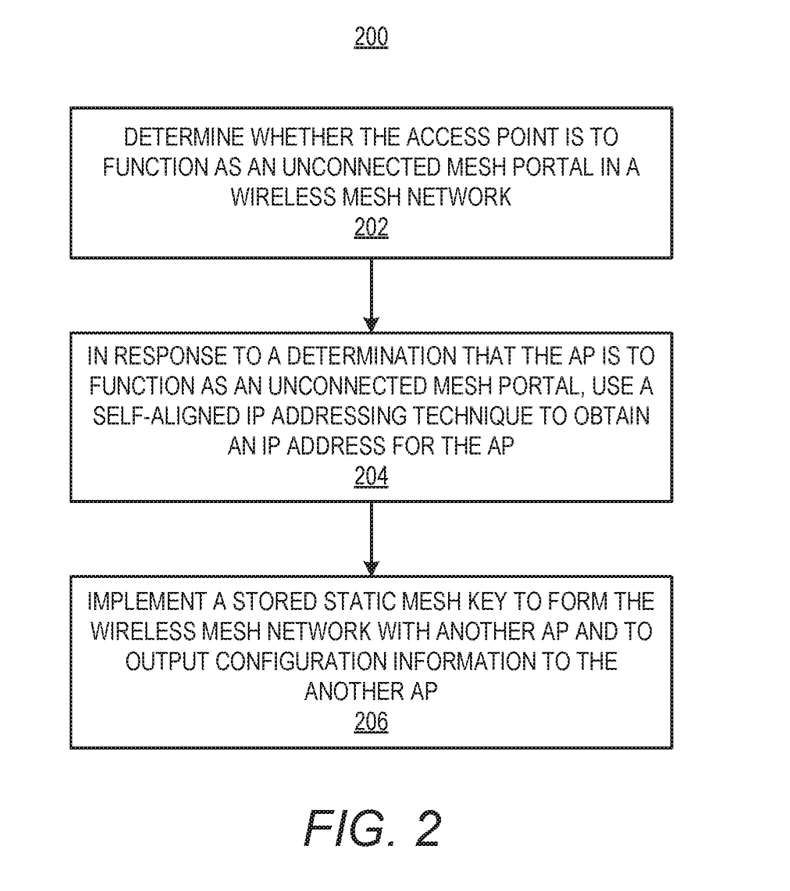
FIGS. 2 and 3, respectively, show flow diagrams of methods for forming a wireless mesh network, according to two examples of the present disclosure.
Figure 3:
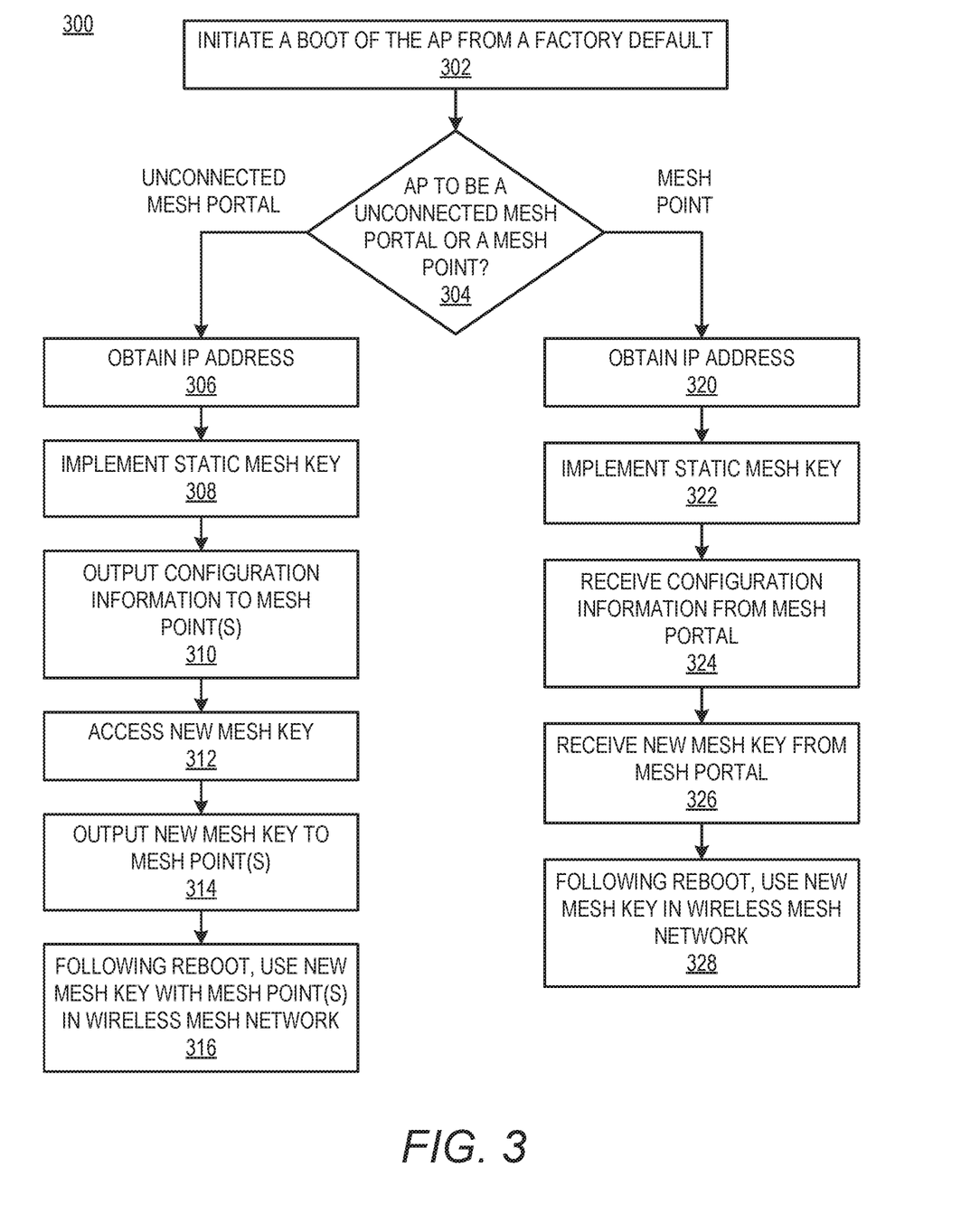

With reference now to FIGS. 2 and 3, there are respectively shown flow diagrams of methods 200 and 300 for forming a wireless mesh network, according to two examples of the present disclosure. It should be understood that the methods 200 and 300 depicted in FIGS. 2 and 3 may include additional operations and that some of the operations described therein may be removed and/or modified without departing from the scopes of the methods 200 and 300. The descriptions of the methods 200 and 300 are made with reference to the access points 110a-110n depicted in FIG. 1 for purposes of illustration and thus, it should be understood that the methods 200 and 300 may be implemented in access points having architectures different from those shown in the access points 110a-110n in FIG. 1.

Generally speaking, the controllers 112 of each of the access points 110a-110 may individually implement or execute the instructions 130-134 stored on the respective instruction apparatuses 114 to perform some or all of the operations recited in one of the methods 200 and 300.

With reference first to the method 200, at block 202, the controller 112 may execute instructions 130 to determine a role of the access point 110a in the wireless mesh network 100. That is, the controller 112 may execute the instructions 130 to determine whether the access point 110a is to function as an unconnected mesh portal in the wireless mesh network. As discussed above, the controller 112 may make this determination in any of a number of different manners. For instance, the controller 112 may determine whether the ports 120 and 122 are connected to each other via an external cable. In this example, the controller 112 may determine that the access point 110a is to function as an unconnected mesh portal in response to a determination that the ports 120 and 122 are connected to each other via an external cable. In this regard, a user may designate the access point 110a to function as an unconnected mesh portal by connecting a cable, such as an Ethernet cable, to both of the ports 120 and 122. That is, one end of an Ethernet cable may be inserted into a first port 120 and an opposite end of the Ethernet cable may be inserted into the second port 122 to designate the access point 110a as an unconnected mesh portal.

As discussed above, however, the access point 110a may be designated to function as the unconnected mesh portal in other manners, e.g., a hardware button, via software, etc.

At block 204, the controller 112 may execute instructions 132 to, in response to a determination that the access point 110a is to function as the unconnected mesh portal in the wireless mesh network 100, use a self-assigned Internet Protocol (IP) addressing technique to obtain an IP address for the access point 110a. According to an example, the controller 112 may use an automatic private IP addressing (APIPA) technique to automatically self-configure an IP address and subnet mask. By way of particular example, the controller 112 may use the APIPA technique to automatically obtain an IP address that is a hash of the media access control (MAC) address of the access point 110a.

As the controller 112 may use the APIPA technique to obtain the IP address, the controller 112 may skip performance of a dynamic host configuration protocol (DHCP) operation to obtain the IP address for the access point 110a. In other words, the controller 112 may have a default setting to perform DHCP to obtain an IP address when the access point 110a is wired to a wired network 140. However, because the controller 112 knows that the access point 110a is not wired to a wired network 140, the controller 112 may not even attempt to obtain an IP address via a DHCP operation. Thus, a booting operation of the controller 112 as disclosed herein may be relatively faster than if the controller 112 attempted to obtain the IP address via a DHCP operation.

At block 206, the controller 112 may execute instructions 134 to implement a stored static mesh key to form the wireless mesh network with another access point and to output configuration information to the another access point. In other words, the controller 112 may access a static mesh key that is stored, for instance, in the data store 116. The static mesh key may be a predefined mesh key that is stored in the data stores 116 of each of a plurality of access points 110a-110n. By storing the same static mesh key in the access points 110a-110n, the controller 112 in the access points 110a-110n may not need to perform a scanning operation to determine the mesh key to be used in communicating data across the wireless mesh network 100. Instead, the access points 110a-110n may all use the same stored static mesh key to at least initially communicate with each other. In this regard, the access points 110a-110n may not need to perform any type of key synchronization with a mesh portal because they already share the same static mesh key. Thus, for instance, the access points 110a-110n may form the wireless mesh network 100 in a relatively faster manner than formation techniques in which the access points 110a-110n perform a scanning operation for a mesh key.

According to an example, the controllers 112 of the access points 110a-110n may be programmed to attempt the static mesh key to determine if the access points 110a-110n are close to a mesh portal for a quick mesh formation. In this example, the controllers 112 may perform a scan for a mesh key for a wireless mesh network if the initial attempt with the static mesh key fails.

With reference now to FIG. 3, there is shown a flow diagram of a method 300 for forming a wireless mesh network 100, according to another example. The method 300 is similar to the method 200 depicted in FIG. 2, but contains additional features and some of the features contained in the method 200 are described in greater detail with respect to the method 300.

At block 302, a booting process of the access point 110a from a factory default setting may be initiated. For instance, the access point 110a may be activated for the first time or after a reset to the factory default setting. In other words, the access point 110a may not be part of any network prior to initiation of the booting operation at block 302.

At block 304, a determination may be made as to whether the access point 110a is to be an unconnected mesh portal or a mesh point in a wireless mesh network 100. More particularly, the controller 112 of the access point 110a may determine that the access point 110a is to be an unconnected mesh portal if the controller 112 determines that a particular condition has been satisfied. For instance, the controller 112 may determine whether a user has indicated that the access point 110a is to be an unconnected mesh portal in any of the manners discussed above with respect to block 202 in FIG. 2.

In response to a determination that the access point 110a is to be an unconnected mesh portal, the controller 112 may obtain an IP address for the access point 110a, as indicated at block 306. As discussed above with respect to block 204, the controller 112 may use a self-assigned IP addressing technique to obtain the IP address. In other words, the controller 112 may bypass performance of a DHCP operation to obtain the IP address for the access point 110a. By way of particular example, the controller 112 may obtain an IP address that is in the 169.254.0.0/16 subnet range.

In addition, at block 308, the controller 112 may implement a static mesh key that was previously stored on the access point 110a. As also discussed above with respect to block 206, the same static mesh key may be stored on multiple ones of the access points 110a-110n prior to their installation into a wireless mesh network. The access points 110a-110n in the wireless mesh network 100 may use the same static mesh key to at least initially communicate data among each other. In one regard, the wireless mesh network 100 may be formed when two or more of the access points 110a-110n communicate with each other using the static mesh key.

At block 310, the controller 112 may output configuration information to the access point(s) 110b-110n that is (are) to function as a mesh point (mesh points) in the wireless mesh network 100. The configuration information may include a service set identifier (SSID), as well as other information to enable the mesh points to connect with clients.

At block 312, the controller 112 may access a new mesh key. For instance, the controller 112 may generate a new mesh key or may access a new mesh key from a set of keys stored in a data store 116 of the access point 110a. In addition, at block 314, the controller 112 may output the new mesh key to the access point(s) 110b-110n that is (are) to function as a mesh point (mesh points) in the wireless mesh network.

At block 316, following a reboot of the access point 110a, the controller 112 may use the new mesh key to communicate with other access points 110b-110n in the wireless mesh network 100 that have also been rebooted and are using the new mesh key. In this regard, the wireless mesh network 100 may be formed of the access points 110a-110n that communicate with each other using the new mesh key. The access points 110a-110n may use the new mesh key, for instance, to enable other wireless mesh networks to be formed near these access points 110a-110n, without using the same mesh key. In other words, use of the new mesh key may enable another wireless mesh network to be automatically formed near the wireless mesh network 100 using the static mesh key. Following the rebooting, the method 300 may end for the access point 110a that is to function as the unconnected mesh portal in the wireless mesh network 100.

Returning back to block 304, in response to a determination that the access point 110b is to be a mesh point, the controller 112 of an access point 110b may obtain an IP address for the access point 110b, as indicated at block 320. Similarly to the controller 112 of the access point 110a, the controller 112 of the access point 110b may use a self-assigned IP addressing technique to obtain the IP address. Thus, for instance, although the controller 112 may have a default setting to perform a DHCP operation to obtain the IP address for the access point 110b, the controller 112 may bypass that setting and instead, may use a self-assigned IP addressing technique, such as APIPA, to obtain the IP address for the access point 110b. In other words, the controller 112 may not attempt to perform a DHCP operation to obtain the IP address.

As the controller 112 may skip performance of a DHCP operation to obtain the IP address for the access point 110b, the amount of time required to obtain the IP address for the access point 110b may be relatively shorter than the amount of time required to attempt to perform a DHCP operation that ultimately fails. According to an example, the controller 112 may determine that the controller 112 is to skip performance of a DHCP operation and to instead use a self-assigned IP addressing technique through any of a number of manners. For instance, the controller 112 may test against a predetermined condition and if the test passes, the controller 112 may bypass DHCP. The predetermined condition may be, for instance, whether a communication from an unconnected mesh portal has a certain address, e.g., a 169 . . . address. As another example, the controller 112 may bypass DHCP if the controller 112 is able to communicate with an unconnected mesh portal using the stored static mesh key. As a yet further example, the unconnected mesh portal, e.g., access point 110a, may send a special message to the access point 110b that the access point 110b is to skip DHCP and perform the self-assigned IP addressing technique.

According to another example, however, the unconnected mesh portal may be equipped with a DHCP server and may assign IP addresses for the access points 110b-110n that are to function as mesh points. In this example, the controller 112 may still perform DHCP to obtain the IP address for the access point 110b.

At block 322, the controller 112 may implement a static mesh key that was previously stored on the access point 110b to communicate with the access point 110a that operates as the unconnected mesh portal. As discussed above with respect to block 206, the same static mesh key may be stored on multiple ones of the access points prior to their installation into a wireless mesh network. The access points 110a-110n in the wireless mesh network 100 may use the same static mesh key to communicate data among each other. In one regard, the wireless mesh network 100 may be formed when two or more of the access points 110a-110n communicate with each other using the static mesh key.

At block 324, the controller 112 may receive configuration information from the access point 110a that operates as the unconnected mesh portal. The configuration information may include a SSID, as well as other information to enable the mesh access point 110b to connect with clients.

At block 326, the controller 112 may receive a new mesh key from the access point 110a that operates as the unconnected mesh portal. In addition, at block 328, following reboot of the access point 110b, the controller 112 may use the new mesh key to communicate with the other access points 110a, 110c-110n that have been rebooted and are using the new mesh key. In this regard, the wireless mesh network 100 may be formed of the access points 110a-110n that communicate with each other using the new mesh key. The access points 110a-110n may use the new mesh key, for instance, to enable other wireless mesh networks to be formed near these access points, without using the same mesh key. Following the rebooting, the method 300 may end for the access point 110b that is to function as a mesh point in the wireless mesh network 100.

According to an example, the rebooting of the access points 110a-110n described at blocks 316 and 328 may differ from the booting described at block 302. That is, the rebooting of the access points 110a-110n may not cause the access points 110a-110n to perform some or all of the operations described with respect to the method 300. In addition, the accessing and use of a new mesh key at blocks 312-316 and blocks 326 and 328 may be optional. For instance, the access points 110a-110n may continue to use the static mesh key in instances in which another wireless mesh network is not to be formed near or otherwise interfere with the wireless mesh network 100.

Some or all of the operations set forth in the methods 200 and 300 may be contained as utilities, programs, or subprograms, in any desired computer accessible medium. In addition, the methods 200 and 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
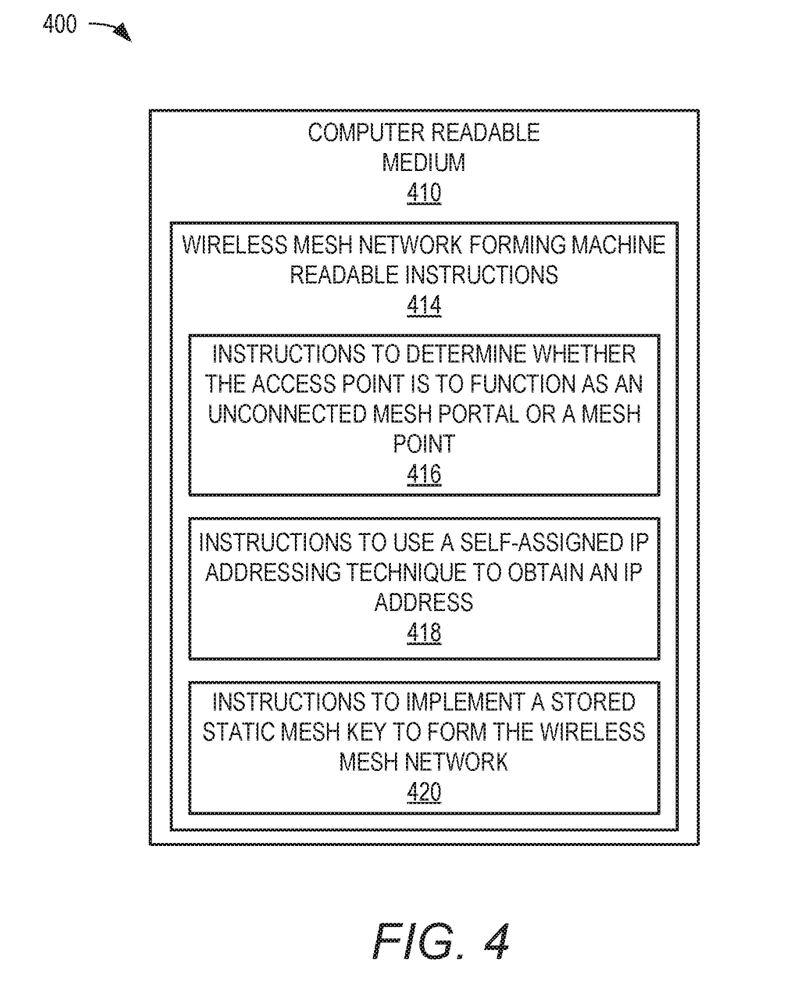
FIG. 4 is schematic representation of a computer readable medium, according to an example of the present disclosure.

Turning now to FIG. 4, there is shown a schematic representation 400 of a computer readable medium 410, according to an example of the present disclosure. The computer readable medium 410 may be any suitable medium that participates in providing instructions to a processor (not shown) for execution. For example, the computer readable medium 410 may be non-volatile media, such as an optical or a magnetic disk; volatile media, such as memory. The computer-readable medium 410 may also store wireless mesh network forming machine readable instructions 414, which, when executed may cause the processor to perform some or all of the methods 200 and 300 depicted in FIGS. 2 and 3. In this regard, the machine readable instructions 414 may include instructions to determine whether the access point is to function as an unconnected mesh portal or a mesh point in the wireless mesh network 416, instructions to use a self-assigned IP addressing technique to obtain an IP address 418, and instructions to implement a stored static mesh key to form the wireless mesh network 420.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
    determining, by an access point, whether the access point is to function as an unconnected mesh portal in a wireless mesh network, wherein the access point has a first port and a second port, and wherein determining whether the access point is to function as the unconnected mesh portal in the wireless mesh network further comprises determining whether the first port and the second port are connected to each other via a cable;
    in response to the determination that the access point is to function as the unconnected mesh portal in the wireless mesh network, using a self-assigned Internet Protocol (IP) addressing technique to obtain an IP address for the access point; and
    implementing a stored static mesh key to form the wireless mesh network with an other access point and to output configuration information to the other access point.

2. The method according to claim 1, wherein determining whether the access point is to function as an unconnected mesh portal further comprises determining whether the access point is to function as an unconnected mesh portal during a booting operation from a factory default of the access point.

3. The method according to claim 1, wherein the unconnected mesh portal is an access point that is not wired to a wired network but functions as a mesh portal.

4. The method according to claim 1, wherein a default setting of the access point is to perform a dynamic host configuration protocol (DHCP) operation to obtain the IP address for the access point, and wherein directly using the self-assigned IP address technique to obtain the IP address for the access point further comprises obtaining the IP address for the access point while skipping performance of the DHCP operation.

5. The method according to claim 1, further comprising:
    in response to a determination that the access point is to not function as the unconnected mesh portal, using the stored static mesh key to communicate with the unconnected mesh portal of the wireless mesh network and join the wireless mesh network.

6. The method according to claim 5, wherein a default setting of the access point is to perform a dynamic host configuration protocol (DHCP) operation to obtain an IP address for the access point, said method further comprising:
    determining that the access point is to skip performance of the DHCP operation; and
    using a self-assigned IP address technique to obtain the IP address for the access point while skipping performance of the DHCP operation.

7. The method according to claim 1, further comprising:
    selecting a new mesh key following formation of the wireless mesh network with the other access point;
    communicating the new mesh key to the other access point; and
    implementing the new mesh key to communicate with the other access point.

8. An access point comprising:
    a first external port;
    a second external port;
    a controller to detect connections to the first external port and the second external port, and wherein the controller is further to:
        determine, while the access point is disconnected from a wired network, whether the access point is to be an unconnected mesh portal or a mesh point in a wireless mesh network, wherein the controller is to determine whether the access point is to be the unconnected mesh portal in a wireless mesh network by determining whether the first external port and the second external port are connected to each other via a cable, and wherein the controller is to determine that the access point is to be the unconnected mesh portal in response to a determination that the first external port and the second external port are connected to each other via a cable;
        in response to the determination that the access point is to be the unconnected mesh portal in the wireless mesh network, use a self-assigned Internet Protocol (IP) addressing technique to obtain an IP address for the access point; and
        implement a stored static mesh key to form the wireless mesh network with an other access point and to output configuration information to the other access point.

9. The access point according to claim 8, wherein the controller has a default setting to perform a dynamic host configuration protocol (DHCP) operation to obtain the IP address for the access point during a booting operation from a factory default, and wherein, further in response to a determination that the access point is to be the unconnected mesh portal in the wireless mesh network, the controller is to obtain the IP address for the access point while skipping performance of the DHCP operation.

10. The access point according to claim 8, wherein the controller has a default setting to perform a dynamic host configuration protocol (DHCP) operation to obtain the IP address for the access point during a booting operation from a factory default, and wherein, in response to a determination that the access point is to be a mesh point, the controller is further to:
    use the stored static mesh key to communicate with the unconnected mesh portal of the wireless mesh network and join the wireless mesh network; and
    use a self-assigned IP address technique to obtain the IP address for the access point while skipping performance of the DHCP operation.

11. A non-transitory computer readable storage medium on which is stored machine readable instructions that when executed by a processor of an access point, cause the processor to:
  determine, while the access point is not wired to a wired network, whether the access point is to function as an unconnected mesh portal or a mesh point in a wireless mesh network, wherein the access point has a first port and a second port, and wherein determining whether the access point is to function as the unconnected mesh portal in the wireless mesh network further comprises determining whether the first port and the second port are connected to each other via a cable;
  in response to a determination that the access point is to function as the unconnected mesh portal in the wireless mesh network, use a self-assigned Internet Protocol (IP) addressing technique to obtain an IP address for the access point; and
  implement a stored static mesh key to form the wireless mesh network with an other access point and to output configuration information to the other access point.

12. The non-transitory computer readable storage medium according to claim 11, wherein the machine readable instructions are further to cause the processor to:
  determine that the access point is to be a mesh point;
  use the stored static mesh key to communicate with the unconnected mesh portal of the wireless mesh network and join the wireless mesh network; and
  use a self-assigned IP address technique to obtain the IP address for the access point while skipping performance of a dynamic host configuration protocol (DHCP) operation.

* * * * *